Jan. 21, 1947.   H. C. NOE   2,414,481
FILM HOLDER
Filed Jan. 27, 1944   2 Sheets-Sheet 2
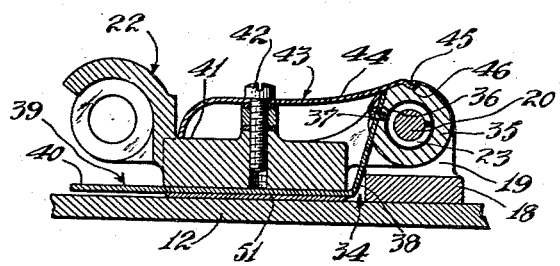
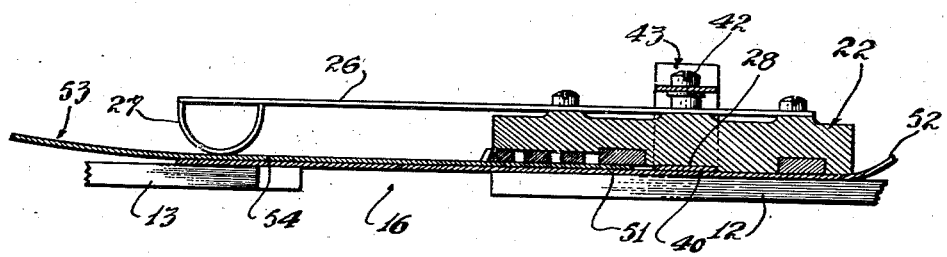
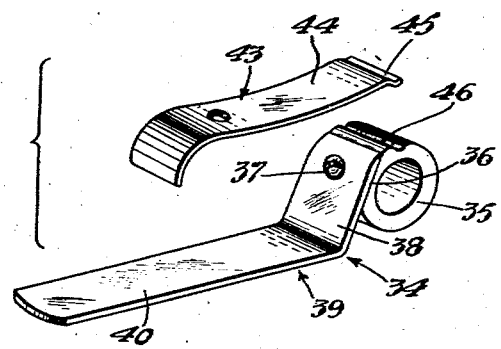
Inventor
Harold C. Noe,
By J. William Careon
Attorney Patented Jan. 21, 1947

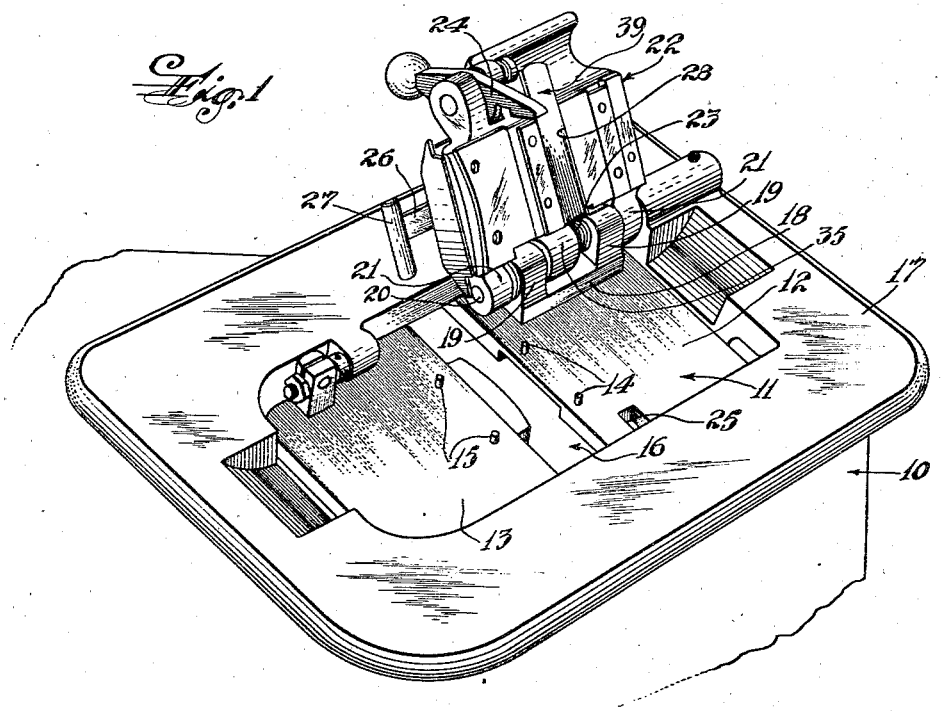
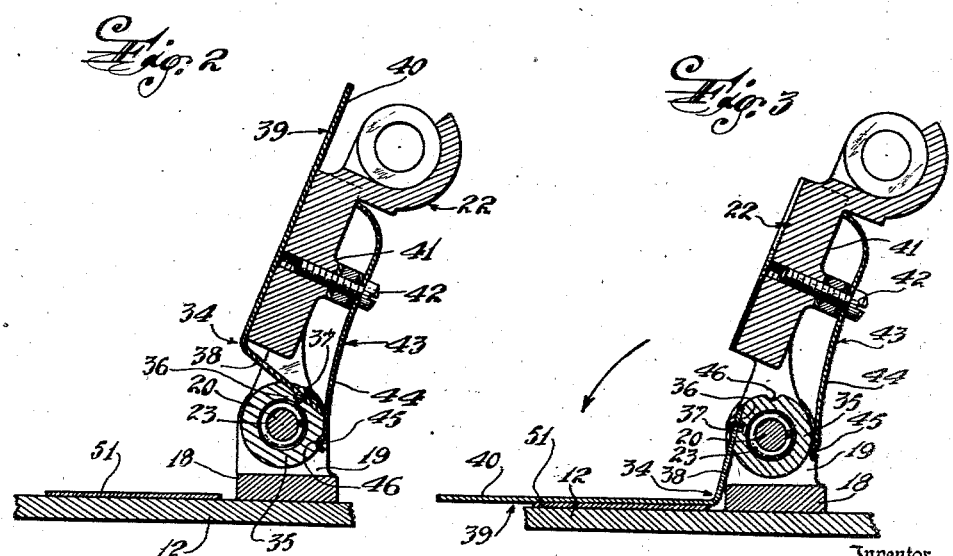

2,414,481

UNITED STATES PATENT OFFICE 2,414,481

FILM HOLDER

Harold C. Noe, Upper Montclair, N. J., assignor to Bloomfield Tool Corporation, Bloomfield, N. J., a corporation of New Jersey Application January 27, 1944, Serial No. 519,836

9 Claims. (Cl. 154—42)

This invention relates to photographic film splicing and more particularly to means for holding the severed portions of the film in position to be spliced.

Films of the continuous moving strip type frequently, due to coiling and/or their inherent fragility, develop cracks and other defects with resultant separation of the film into severed portions which effects interruption in the continuity of the projection of the picture. In order to preclude separation during projection, the films are usually inspected after each projection in order that any defects may be detected and remedied prior to subsequent projection. To remedy any defects, one or more of the picture frames of the film or the areas containing the defects are severed and removed from the film and the remaining or severed portions of the film are spliced together by adhesively securing their severed end zones in lapped relation.

To facilitate splicing of the film in a more accurate and expeditious manner, machines substantially automatic in operation are employed. A machine of this type is usually equipped with film supporting means or the like on which the end sections of the severed portions of the film to be spliced are received, the means being provided with spaced plates having groups of pins and defining a slot therebetween over which the end zones of the end sections extend and through which slot a device is operated to condition and splice the end sections. The pins extend into the usual sprocket receiving perforations of the sections of severed film portions, adjacent their end zones, to secure the end sections in lapped relation and maintain the proper registry of the picture frames and perforations of the respective end zones.

Obviously, extreme care must be taken to effect the correct spacing and registry of the picture frames and perforations of the end zones when they are initially positioned on the plates in lapped relation for splicing.

Inasmuch as some film has an inherent tendency to coil or buckle when positioned in the machine, and in instances where the frictional engagement of the pins with the film is insufficient to maintain it in adjusted position, it can be readily understood that when the fingers of the operator are removed from one of the end sections to permit and effect closing of the gate, an interval is thus made available wherein the end section released will coil or buckle away from the plate and the other section, thereby necessitating one or many rearrangements of the released section into proper position before the gate can be closed and the machine operated. Obviously, coiling or displacement of the film previous to the closing of the gate establishes a cumbrous condition with attendant loss of valuable time.

The present invention aims to preclude the foregoing described coiling or displacement of the film, it being one of the objects thereof to provide a device or film holder for maintaining the film in position for splicing in a manner to permit removal of the fingers from the film, whereby the gate may be closed to hold the film upon the plates during splicing.

Another object is to provide a film holder of the foregoing described character which is equipped with film holding means latchably retained in engagement with the film to secure the same against displacement previous to and during the closing of the gate.

Another object is to provide a film holder of the foregoing described character wherein the film holding means or finger is operated out of film holding position by the gate when the latter is so operated thereby facilitating quick removal of the spliced film from the machine.

Another object is to provide a device of the foregoing described character so constructed and arranged as to be readily attached to film splicing machines already in use and without substantially modifying the machines.

A further object is to provide a film holder of the foregoing described character which is simple in construction and economical in manufacture, durable in use, efficient in operation, and which is easily assembled in combination with a film splicing machine for operation therewith.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Figure 1 is a perspective view of a portion of a film splicing machine illustrating an embodiment of the invention in conjunction therewith.

Figures 2, 3 and 4 are transverse sectional views of the structure illustrated in Figure 1, showing the film holder in different positions relative to the gate, respectively.

Figure 5 is a longitudinal, sectional view of the structure illustrated in Figure 1, showing the gate and film holder disposed in engagement with the severed end portions of a film.

Figure 6 is a disassembled perspective view of the film holder.

With reference to the drawings, and more particularly to Figure 1 thereof, there is illustrated a portion 10 of a film splicing machine equipped with a film supporting bed or means 11 comprising right-hand and left-hand film receiving plates 12 and 13 provided with groups of pins 14 and 15, respectively. The bed is formed with a transversely extending slot 16 laterally defined by the plates and through which a plurality of tools or the like (not shown) are operated for conditioning and splicing the film upon operation of the machine.

The bed or means 11 has mounted thereon a frame 17 which embraces the plates 12 and 13, the plate 13 being movable towards and away from the plate 12 for shifting a section of film as hereinafter made apparent. The plate 12 is provided with a hinge member 18 having a pair of spaced bearings 19 through which extends a pintle or shaft 20 to which is fixed a pair of lugs 21 of a film holding gate or means 22. Between the bearings 19, the pintle has sleeved thereon a coil spring 23 having one end connected to the gate and the other end to the pintle and which spring functions to urge and maintain the gate in open position for a purpose hereinafter made apparent. The gate is provided with a latch 24 which extends through a keeper slot 25 in the plate 12 and latches the gate, under tension of the spring 23, to the bed in film holding position over the film, the latch being automatically operated upon termination of the splicing of the film to release the gate and thus effect automatic operation of the gate to open position by the spring 23.

As shown in Figures 1 and 5, the gate 22 is equipped with a laterally projecting arm or bridge member 26 which extends over the slot 16, the member being provided with a shoe 27 for engaging film disposed on the left-hand film receiving plate 13 when the gate is in closed position. The face of the gate, adjacent the plate 12, is slightly modified and joined with a transverse channel 28 for a purpose hereinafter more fully disclosed. The plate 13 is shiftable towards and away from the plate 12 for shifting the section of film retained thereon with lapped relation with the section retainer on the plate 12 as hereinafter made apparent. Inasmuch as the foregoing described parts of the machine form no part of the present invention per se, a more detailed disclosure of the same is not believed necessary.

For cooperation with the gate 22, there is provided means 34 (Figures 2, 3, 4 and 6) for initially retaining the film comprising a tubular member or sleeve 35 rotatably mounted on the spring 23 and formed with a flat face 36 having attached thereto, by means of a screw 37, one terminal part 38 of a spring finger 39, the opposite terminal part 40 of the finger being disposed in angular relation with the end 38 and within the channel 28 of the gate when the latter is in closed position as illustrated in Figure 4 of the drawings.

The gate is provided with a seat 41 on which is secured, by means of a screw 42, one end section of a leaf spring 43. The opposite end section 44 of the leaf spring 43 extends over the sleeve 35 and is formed with a detent 45 for seating into a longitudinally extending slot 46 formed on the circumferential face on the sleeve 35. The slot 46 accommodates the detent 45 to latch the finger 39 to the gate when the gate and finger are in film holding positions as illustrated in Figure 4, thus effecting unitary operation of both the finger and gate to open positions as illustrated in Figure 2.

In operation, the gate 22 and finger 39 being in the open positions shown in Figure 2, the fingers of both hands of the operator are employed to manipulate and position the end section 51 of the right-hand severed portion 52 of the film 53 upon the right-hand film receiving plate 12 with the pins 14 extending through the usual perforations of the section 51 (not shown). When the section 51 is thus positioned upon the plate 12, the fingers of the operator's left and right hands serve to hold the end zone and the adjacent zone of the section 51, respectively, against displacement, whereupon, the fingers of the right hand are removed from the adjacent zone to operate the finger 39 into closed or film holding position over the adjacent zone and thus secure and maintain the section 51 against displacement, the detent 45 of the spring 43 being disposed out of the slot 46 as illustrated in Figure 3.

When the section 51 is thus secured, the fingers of the left hand are removed and which fingers together with the fingers of the right hand are employed to manipulate and position the end section 54 of the left-hand severed portion 53 of the film upon the left-hand film receiving plate 13 in the same manner as described in connection with the section 51 and with the end zones of both sections in lapped relation. When section 54 is thus positioned, the fingers of the right hand are removed from the end zone thereof and employed to operate the gate to closed or film holding position over the finger 39 and entire section 51, the shoe 27 serving to hold the end zone of the section 54.

When the gate is thus closed, the fingers of the left hand are removed from the section 54 and the machine operated for splicing and in a manner wherein the tool means are sequentially actuated to skive the emulsion from the emulsified surface of the end zone of the end section nearest the skiving tool; transversely cut both end zones immediately and laterally adjacent the aforementioned skived surface to dispose the end faces thus formed in substantially registering and abutting relation; move the plate 13 away from the plate 12 to longitudinally shift the section 54 away from the section 51 to space their confronting end faces in a manner to confine an application of adhesive solely to the skived surface; apply the adhesive to the skived surface; move the plate 13 towards the plate 12 to reshift the section 54 to dispose its end zone in spaced, lapped relation with the end zone of the section 51 and with the adhesive coated surface between the lapped zones, and apply pressure to the lapped zones to secure them together to form a lap joint and thus complete the splicing.

When the severed end portions of the film are spliced as heretofore described, the gate is automatically operated to open position, and, inasmuch as the finger 39 is latched to the gate, as illustrated in Figure 4, it is also operated to open position with the gate, as illustrated in Figure 2, thus permitting expeditious removal of the Jan. 21, 1947.　　　　K. NORMAN　　　　2,414,482
ELECTRIC SOLDERING IRON
Filed Oct. 18, 1943
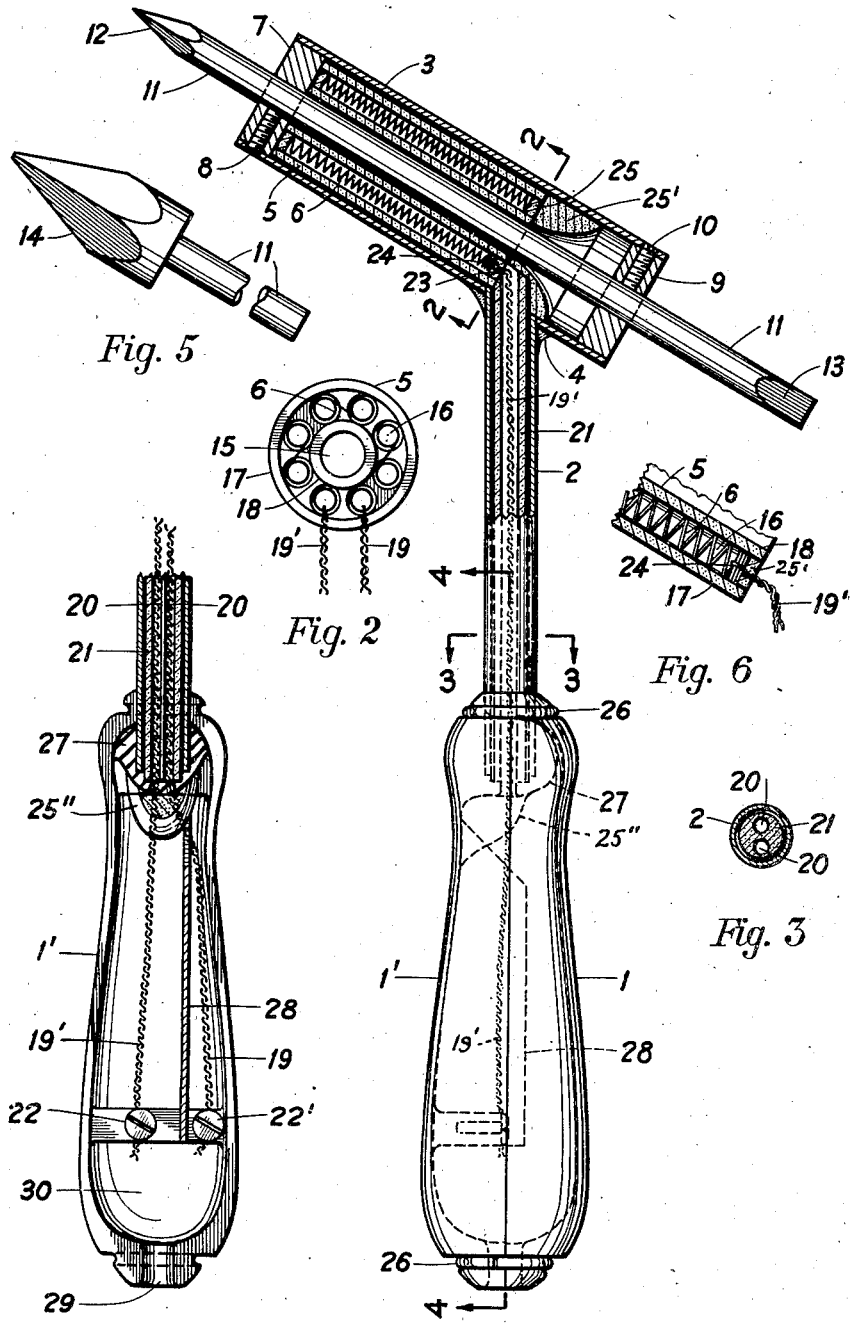
INVENTOR.
KELSO NORMAN
BY
*Attorney*